US009819962B2

(12) United States Patent
Mammou et al.

(10) Patent No.: US 9,819,962 B2
(45) Date of Patent: Nov. 14, 2017

(54) EFFICIENT LOW-COMPLEXITY VIDEO COMPRESSION

(71) Applicant: ATI Technologies ULC, Markham (CA)

(72) Inventors: Khaled Mammou, Markham (CA); Ihab M. A. Amer, Markham (CA); Gabor Sines, Markham (CA); John-Paul A. Compagnone, Markham (CA); Gerald S C Chan, Markham (CA); Ying Luo, Markham (CA); Edward A. Harold, Markham (CA); Lei Zhang, Markham (CA); Benedict Chien, Markham (CA)

(73) Assignee: ATI TECHNOLOGIES ULC, Markham, Ontario (CA)

( * ) Notice: Subject to any disclaimer, the term of this patent is extended or adjusted under 35 U.S.C. 154(b) by 290 days.

(21) Appl. No.: 14/679,799

(22) Filed: Apr. 6, 2015

(65) Prior Publication Data

US 2016/0295234 A1    Oct. 6, 2016

(51) Int. Cl.
*H04N 19/567*  (2014.01)
*H04N 19/426*  (2014.01)
*H04N 19/105*  (2014.01)
*H04N 19/154*  (2014.01)
*H04N 19/176*  (2014.01)

(52) U.S. Cl.
CPC ......... *H04N 19/567* (2014.11); *H04N 19/426* (2014.11); *H04N 19/105* (2014.11); *H04N 19/154* (2014.11); *H04N 19/176* (2014.11)

(58) Field of Classification Search
CPC .. H04N 19/567; H04N 19/426; H04N 19/105; H04N 19/154; H04N 19/176
USPC ................................... 375/240.16
See application file for complete search history.

(56) References Cited

U.S. PATENT DOCUMENTS

| | | | |
|---|---|---|---|
| 5,289,549 A | 2/1994 | Rattey et al. | |
| 5,421,023 A | 5/1995 | Murakami | |
| 7,092,584 B2 | 8/2006 | Perlmutter et al. | |
| 7,292,164 B1* | 11/2007 | Wegener | G06F 17/141 |
| | | | 341/76 |
| 2011/0279293 A1* | 11/2011 | Deslandes | G06T 9/00 |
| | | | 341/87 |

(Continued)

FOREIGN PATENT DOCUMENTS

JP    2014-200021 A    10/2014

*Primary Examiner* — William C Vaughn, Jr.
*Assistant Examiner* — Jae N Noh
(74) *Attorney, Agent, or Firm* — Volpe and Koenig, P.C.

(57) ABSTRACT

Disclosed is a low-complexity and yet efficient lossy method to compress distortion information for motion estimation, resulting in significant reduction in needed storage capacity. A system for implementing the method and a computer-readable medium for storing the method are also disclosed. The method includes determining and storing a distortion value for each trial motion vector in a plurality of trial motion vectors. Each trial motion vector specifies a position of a search region relative to a reference frame. The method further includes compressing each of the distortion values as a fixed number of bits based upon a minimum distortion value amongst the stored distortion values, and re-storing each compressed distortion value in place of its uncompressed value.

17 Claims, 4 Drawing Sheets

(56) References Cited

U.S. PATENT DOCUMENTS

2013/0243083 A1* 9/2013 Sezer .................... H04N 19/60
   375/240.02
2016/0057417 A1    2/2016 Kawamura et al.

* cited by examiner

FIG. 4

EFFICIENT LOW-COMPLEXITY VIDEO COMPRESSION

FIELD OF THE INVENTION

The present invention is generally directed to video processing, and in particular to video compression.

BACKGROUND

Video encoders apply motion-compensated prediction in order to reduce the amount of image data that must be encoded. This is done by exploiting temporal correlation between successive frames. For example, if a video shows an object moving against a stationary background, only the information representing the moving object needs to be encoded once the information representing the background has been obtained. Motion of the object between a reference frame and a frame currently being encoded is described by motion vectors.

Motion-compensated prediction or motion estimation (ME) includes finding, for each possible pixel block size of a current frame, the "best-possible" match among blocks within a previously encoded frame called a reference frame. Most encoders measure distortion induced by choosing a certain block as a predictor. The "best-possible" match is chosen by minimizing a distortion value subject to a bitrate budget. Since distortion tends to increase as bitrate increases, finding the "best-possible" match subject to a bitrate budget is referred to as rate-distortion (RD) optimization.

Highly accurate ME algorithms are prohibitively expensive in terms of computational complexity and memory bandwidth. The complexity of ME has even increased with the recent High Efficiency Video Encoding (HEVC) standard, which allows prediction block sizes from 4×8 pixels up to 64×64 pixels, whereas previous commonly used standards often used blocks of 8×8 pixels. Since searching for the best match for every possible block size involves redundant computations, practical implementations of software and/or hardware video encoders store distortion values of smaller blocks (e.g., 4×8, 8×8 and 16×16) to re-use them when evaluating RD costs of bigger blocks (e.g., 32×32 and 64×64).

Such merge-based strategies offer the advantage of providing accurate motion estimations at a low computational complexity and memory bandwidth costs. However, these advantages are obtained at the cost of high storage requirements, since distortion values need to be stored for every possible combination of a block size and motion vector within the search area.

SUMMARY OF EMBODIMENTS

Disclosed is a low-complexity and yet efficient method to compress distortion information for motion estimation, resulting in significant reduction in needed storage capacity. A system for implementing the method and a computer-readable medium for storing the method are also disclosed.

The method, in one embodiment, includes determining and storing a distortion value for each trial motion vector in a plurality of trial motion vectors. Each trial motion vector specifies a position of a search region relative to a reference frame. The method further includes compressing each of the distortion values as a fixed number of bits based upon a minimum distortion value amongst the stored distortion values, and re-storing each compressed distortion value in place of its uncompressed value.

BRIEF DESCRIPTION OF THE DRAWINGS

A more detailed understanding may be had from the following description, given by way of example in conjunction with the accompanying drawings wherein.

DETAILED DESCRIPTION OF EMBODIMENT(S)

Figure 1:
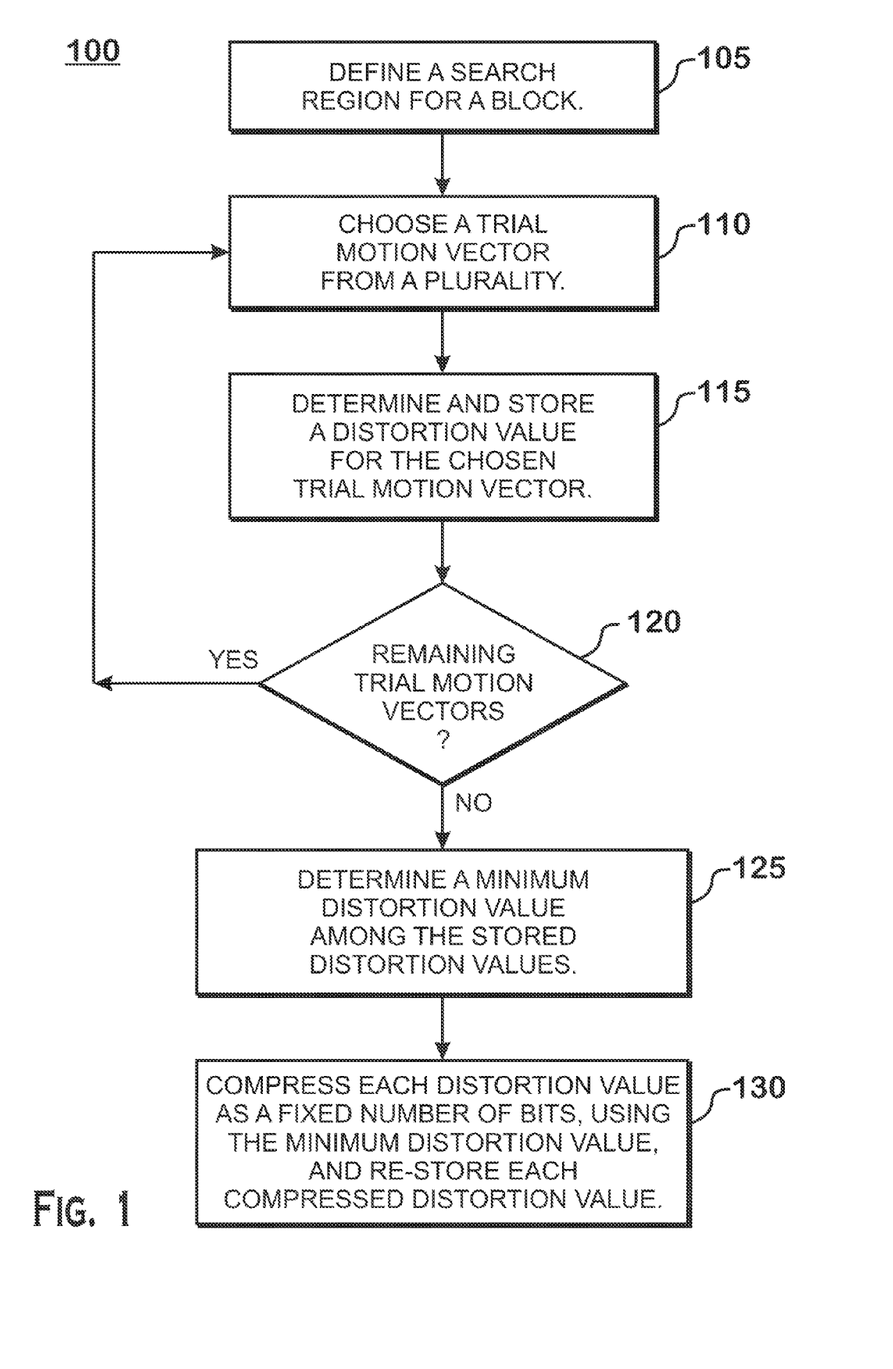
FIG. 1 shows an example of a method of compressing motion estimation information in video processing.

FIG. 1 shows an example of a method of compressing motion estimation information in video processing. A search region for a block of image pixels in a current frame is defined 105. The search region may have an area smaller than the area of the reference frame and may have a fixed shape or a variable shape. A position of the search region relative to a reference frame is defined by a motion vector. A trial motion vector is chosen from a plurality of motion vectors 110. A distortion value for the chosen motion vector is determined and stored 115. This sequence continues until a distortion value for each trial motion vector has been determined and stored 120.

Once a distortion value for each trial motion vector has been determined and stored, a minimum distortion value among the stored distortion values is determined 125. Then, each of the stored distortion values is compressed as a fixed number of bits, or using a fixed number of bits, the compression using the minimum distortion value. Each compressed distortion value is then re-stored, in place of its uncompressed value 130. In this way, the amount of storage space needed to store the distortion values for different trial motion vectors maybe significantly reduced.

A distortion value may be determined using any of numerous known methods, including, but not limited to, sum of absolute differences (SAD), sum of absolute transformed differences (SATD) or sum of square errors (SSE). In general, the distortion measures exhibit the following properties:

1) They are positive integers or zero;

2) They have high spatial correlations—that is, for a given block, neighboring motion vectors have close distortion values; and 3) Trial motion vectors associated with low distortion values of smaller blocks have a higher probability to be chosen.

In such methods, pixel values in the search region are compared with pixel values in a corresponding region in the reference frame. Numbers representing these comparisons are then combined into a single number—a distortion value—that acts as a measure of how similar or how different the two groups of pixel values are. In an embodiment, compressing and decoding the distortion values as a fixed number of bits 230 may be done using methods that require only add, shift, and bitwise AND operations, thereby simplifying and speeding up the execution of the method. Such methods may be suitable for on-the-fly encoding and decoding. As an example of such a method, compressing a distortion value may be done by determining and storing two binary integers p and q, both having a user-defined bit length, such that for all possible such binary integer pairs the expression:

$$p*2^{q+s}+D_k \qquad \text{Equation (1)}$$

is closest to the distortion value being compressed, wherein $D_k$ is the minimum distortion value and s is a fixed compression shift. The compressed distortion value D' may then be expressed as $$D' \approx p*2^{q+s}+D_k \qquad \text{Equation (2)}$$

where "≈" may be read as "is approximated by". For later computations, a decoded distortion value D may be obtained by retrieving the stored p and q and computing the value $$D = p*2^{q+s}+D_k \qquad \text{Equation (3)}$$

where "=" is read as "is equal to". In one specific example of this embodiment, the user-defined bit length of p may be six and of q two, in which the distortion value is compressed as eight bits. By contrast, in the past, non-compressed stored values of SAD or SATD have been represented by 16-24 bits.

An example of an algorithm for compressing a distortion value as in Equation 2 is:

```
// user-defined parameters
const unsigned int SAD_COMPRESSION_NUM_BITS = 8;
const unsigned int SAD_COMPRESSION_SHIFT0   = 4;
const unsigned int SAD_COMPRESSION_SHIFT1   = 6;
const unsigned int SAD_COMPRESSION_MASK0    =
(1<<SAD_COMPRESSION_SHIFT1) - 1;
const unsigned int SAD_COMPRESSION_MASK1    =
(1<<(SAD_COMPRESSION_NUM_BITS-SAD_COMPRESSION_SHIFT1)) - 1;
// compression process
unsigned int compress_sad(unsigned int sad, unsigned int Dk)
{
  // subtract Dk
  sad -= Dk;
  // compute p and q
  unsigned int q = 0;
  unsigned int p = (sad >> SAD_COMPPSION_SHIFT0);
  while (p > SAD_COMPPSION_MASQ0)
  {
    p = (p >> 1);
    ++q;
  }
  p = (sad + (1 << (q+SAD_COMPPSION_SHIFT0-1))) >>
(q+SAD_COMPPSION_SHIFT0);
  // cap p and q if out of range
  if (q>SAD_COMPPSION_MASQ1) q = SAD_COMPPSION_MASQ1;
  if (p>SAD_COMPPSION_MASQ0) p = SAD_COMPPSION_MASQ0;
  // combine p and q in one unsigned integer value
  unsigned int res = p + (q << SAD_COMPPSION_SHIFT1);
  return res;
}
```

An example of an algorithm for decoding a distortion value as in Equation 3 is:

```
// user-defined pareameters
const unsigned int SAD_COMPRESSION_NUM_BITS = 8;
const unsigned int SAD_COMPRESSION_SHIFT0   = 4;
const unsigned int SAD_COMPRESSION_SHIFT1   = 6;
const unsigned int SAD_COMPRESSION_MASK0    =
(1<<SAD_COMPRESSION_SHIFT1) - 1;
const unsigned int SAD_COMPRESSION_MASK1 =
(1<<(SAD_COMPRESSION_NUM_BITS-SAD_COMPRESSION_SHIFT1)) - 1;
// decompression process
unsigned int decompress_sad(unsigned int res, unsigned int Dk)
{
  return ((res & SAD_COMPRESSION_MASK0) << ((res >>
SAD_COMPRESSION_SHIFT1) + SAD_COMPRESSION_SHIFT0)) + Dk;
}
```

Figure 2:
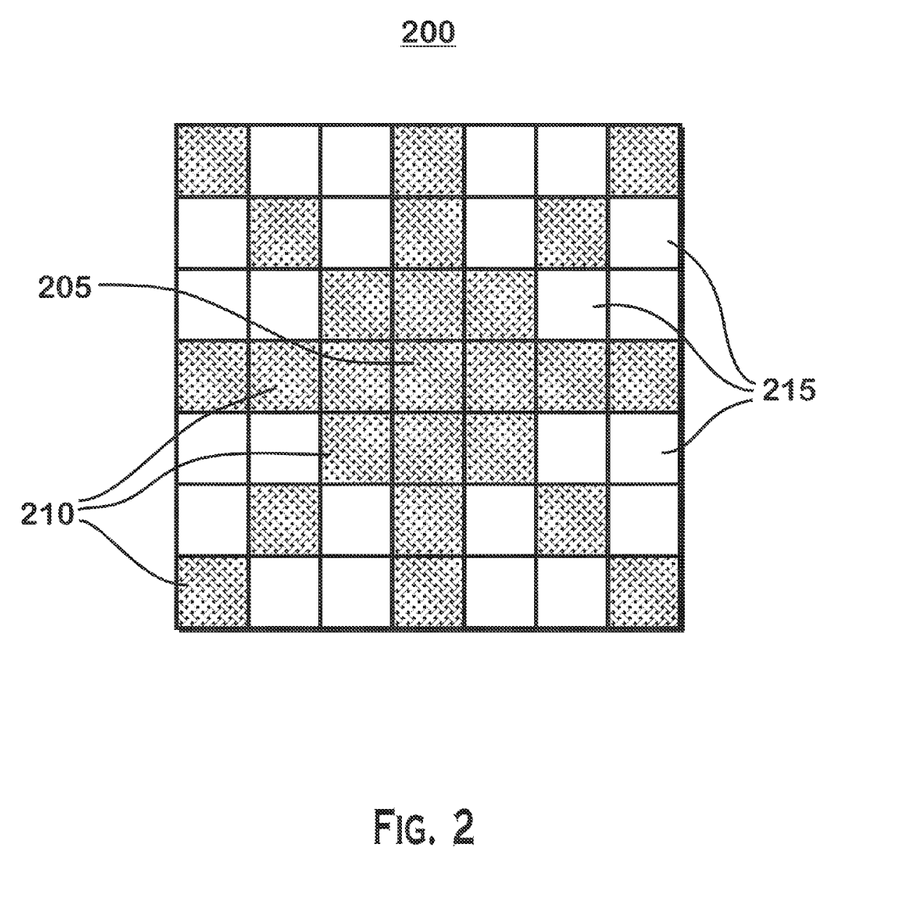
FIG. 2 shows an example of a search region.

The accuracy of a motion vector determined using a method such as those described above may be refined using a method shown in FIGS. 2 and 3. FIG. 2 shows an example of a search region 200 divided into subregions, the subregions shown as smaller squares within search region 200. Search region 200 is illustrated as a square divided into 49 subregions in a 7×7 array, although none of these features—shapes, number of subregions, etc.—is to be considered limiting. Search region 200 represents the search region with the minimum distortion value for a given block, as described hereinbefore. The location of the center subregion 205 approximately indicates the previously determined motion vector associated with search region 200. The location of each of the other subregions indicates a motion vector differing from, but close to, the previously determined motion vector.

Figure 3:
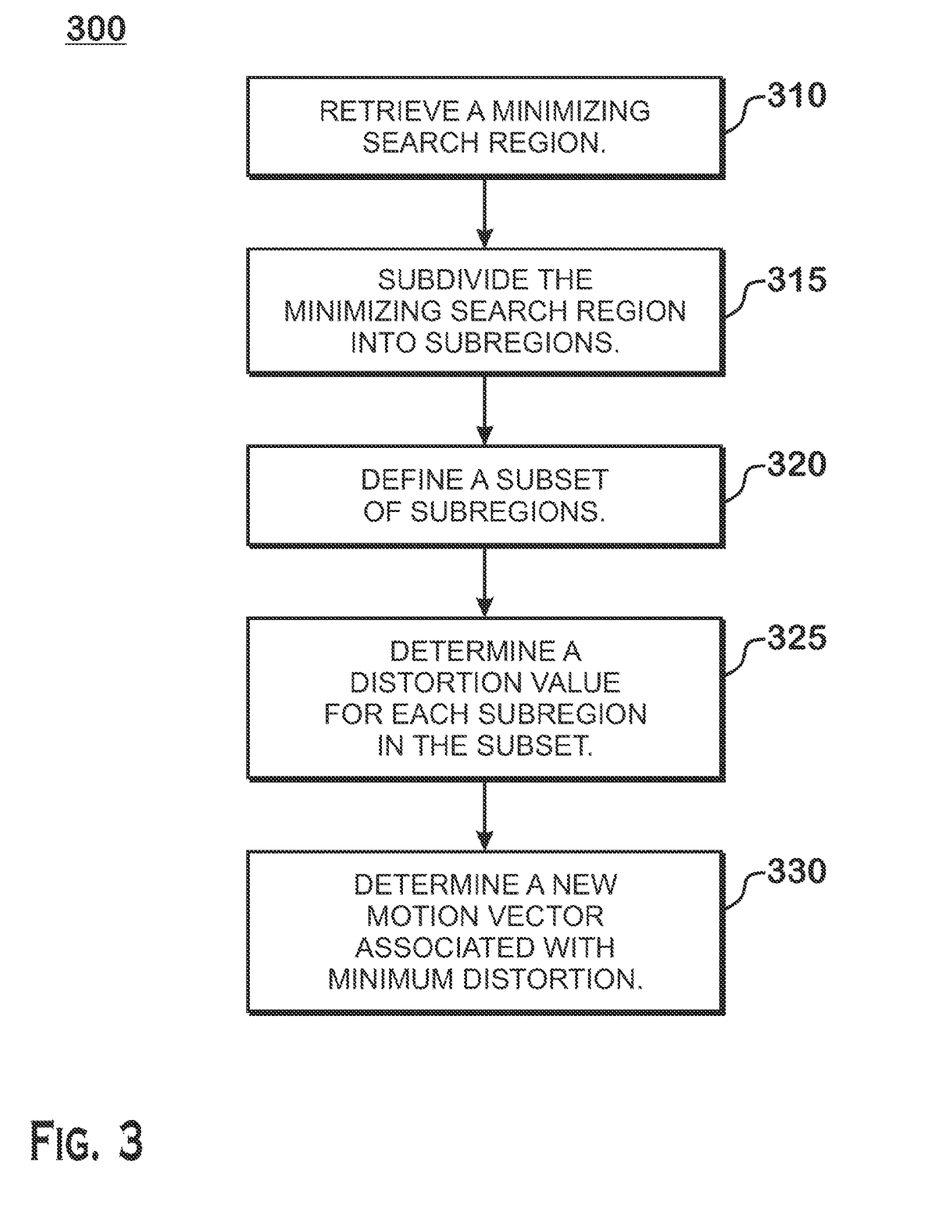
FIG. 3 shows another example of a method of compressing motion estimation information in video processing.

FIG. 3 shows a method of refining a previously determined motion vector associated with minimum distortion. A minimizing search region is retrieved from storage 310. This minimizing search region is associated with a previously determined trial motion vector resulting in a minimum distortion value, as described hereinbefore. The minimum search region is divided into subregions, as shown in FIG. 2 and described above, 315. A subset of these subregions is then selected 320. An example of such a subset, not to be construed as limiting, is shown by the dark squares 210 in FIG. 2. Subregions not in the subset are shown as lighter squares 215. The subset may be approximately centered around the subregion 205 associated with the trial motion vector associated with the minimum distortion value. The density of subregions in the subset may decrease with increasing distance from the center subregion 205, reflecting the idea that the best motion vector is more likely to be closer to the center 205.

Returning to FIG. 3, once the subset of subregions is defined, a new distortion value is determined and stored for each subregion in the subset 325. Each new distortion value may be compressed before storing using a method such as that described hereinbefore. A new minimum distortion value is determined among the new distortion values determined from the subset, and a new, refined motion vector associated with the new minimum distortion value is determined, 330.

In an alternative, a distortion value for each subregion not in the subset, such as subregions 215 in FIG. 2, may be interpolated using stored distortion values for subregions in the subset 210. The interpolated distortion values may then be used along with distortion values determined for the subset 210 in refining a previously determined motion vector.

Figure 4:
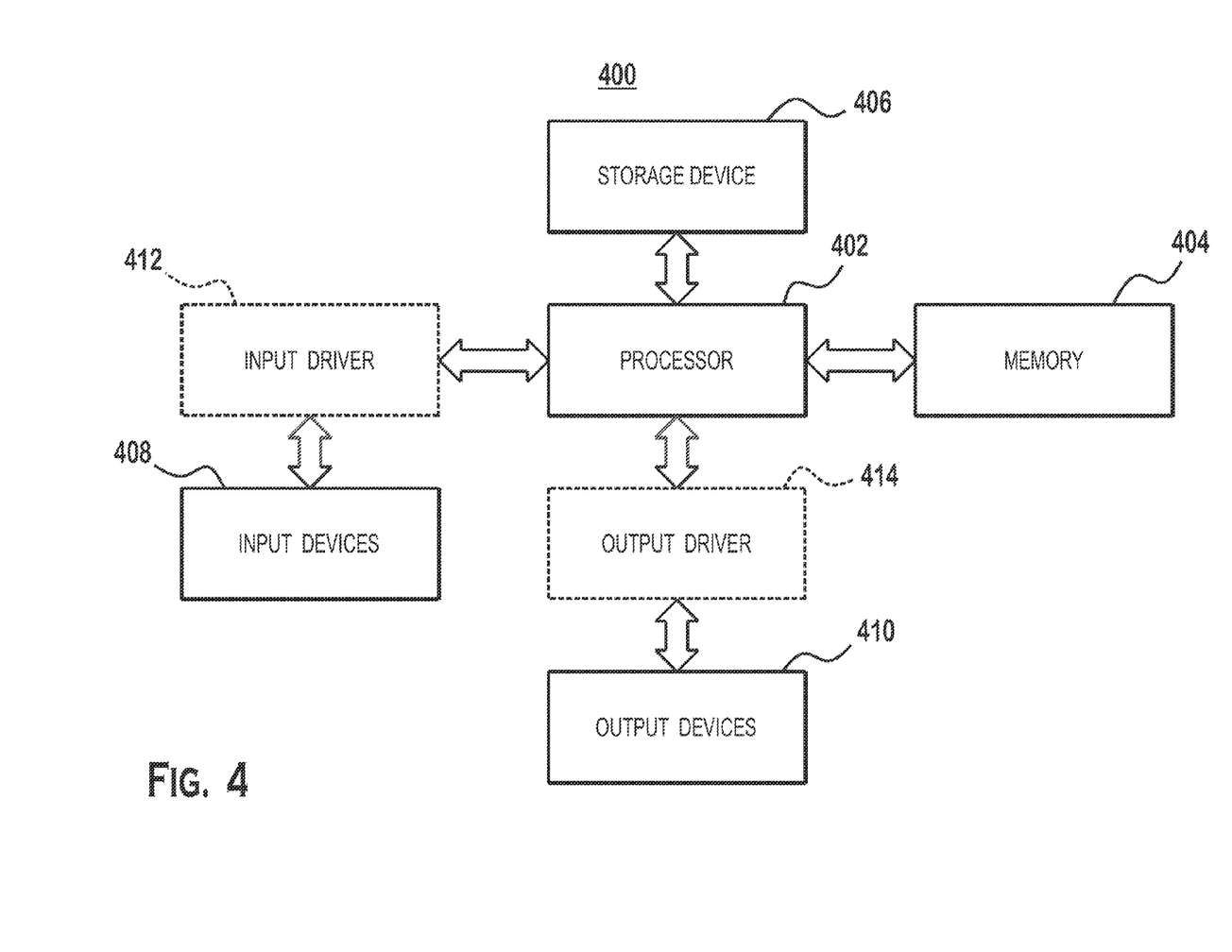
FIG. 4 is a block diagram of an example system in which one or more disclosed method embodiments may be implemented.

FIG. 4 is a block diagram of an example system 400 in which one or more disclosed embodiments may be implemented. The system 400 may include, for example, a computer, a gaming device, a handheld device, a set-top box, a television, a mobile phone, or a tablet computer. The system 400 includes a processor 402, a memory 404, a storage device 406, one or more input devices 408, and one or more output devices 410. The system 400 may also optionally include an input driver 412 and an output driver 414. It is understood that the system 400 may include additional components not shown in FIG. 4.

The processor 402 may include a central processing unit (CPU), a graphics processing unit (GPU), a CPU and GPU located on the same die, or one or more processor cores, wherein each processor core may be a CPU or a GPU. The memory 404 may be located on the same die as the processor 402, or may be located separately from the processor 402. The memory 404 may include a volatile or non-volatile memory, for example, random access memory (RAM), dynamic RAM, or a cache.

The storage device 406 may include a fixed or removable storage, for example, a hard disk drive, a solid state drive, an optical disk, or a flash drive. The input devices 408 may include a video camera, video disc player, or other source of video images, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 410 may include a video screen, a display, a speaker, a printer, a haptic feedback device, one or more lights, an antenna, or a network connection (e.g., a wireless local area network card for transmission and/or reception of wireless IEEE 802 signals).

The input driver 412 communicates with the processor 402 and the input devices 408, and permits the processor 402 to receive input from the input devices 408. The output driver 414 communicates with the processor 402 and the output devices 410, and permits the processor 402 to send output to the output devices 410. It is noted that the input driver 412 and the output driver 414 are optional components, and that the system 400 will operate in the same manner if the input driver 412 and the output driver 414 are not present.

System 400 may be configured to perform embodiments of a method of compressing motion estimation information in video processing as described hereinbefore. For example, memory 404 or storage device 406 may be configured to store a search region for a block and a plurality of trial motion vectors. Processor 402 may be configured to determine a distortion value associated with each trial motion vector in the plurality of trial motion vectors, each trial motion vector specifying a position of the search region relative to the block. Processor 402 may be configured to store distortion values in memory 404 or storage device 406. Processor 402 may be configured to determine a minimum distortion value among the stored distortion values and its associated trial motion vector. Processor 402 may be configured to compress each of the distortion values as a fixed number of bits using the minimum distortion value, and re-store each compressed distortion value in memory 404 or storage device 406.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of compressing motion estimation information in video processing, the method comprising:
   determining and storing a distortion value for each trial motion vector in a plurality of trial motion vectors, wherein each trial motion vector specifies a position of a search region relative to a reference frame; and
   compressing each of the distortion values as a fixed number of bits based upon a minimum distortion value amongst the stored distortion values, and re-storing each compressed distortion value in place of its uncompressed value,
   wherein compressing each of the distortion values comprises determining and storing binary integers p and q, both having user-defined bit lengths, the binary integer p including a series of bits, and the binary integer q determining, along with a fixed compression shift value s, the degree to which the binary integer p is shifted; and
   wherein the compressed distortion value exceeds the minimum distortion value by the value of p shifted based on q and s.

2. The method of claim 1, wherein the distortion value is one of: a sum of absolute differences (SAD), a sum of absolute transformed differences (SATD), or a sum of square errors (SSE).

3. The method of claim 1, wherein compressing each of the distortion values requires only add, shift, and bitwise AND operations.

4. The method of claim 1, wherein the user-defined bit length of p is six and of q is two.

5. The method of claim 1, further comprising decoding each compressed distortion value for later computations, wherein the decoded value is equal to $p*2^{q+s}+D_k$, wherein $D_k$ comprises the minimum distortion value.

6. The method of claim 1, further comprising refining the trial motion vector associated with minimum distortion by:
   retrieving a minimizing search region having the trial motion vector associated with the minimum distortion value;
   subdividing the minimizing search region into subregions;
   defining a subset of the subregions approximately centered around the trial motion vector associated with the minimum distortion value;
   determining a distortion value for each subregion in the subset; and
   determining a new motion vector associated with a minimum distortion value from the distortion value for each subregion in the subset.

7. The method of claim 6, further comprising interpolating a distortion value for each subregion not in the subset using stored distortion values for subregions in the subset.

8. A system for video encoding, comprising:
   a processor; and
   a storage device;
   the system being configured to perform a method of compressing motion estimation information in video processing, the method comprising:
      the processor determining and storing in the storage device a distortion value for each trial motion vector in a plurality of trial motion vectors, wherein each trial motion vector specifies a position of a search region relative to a reference frame; and
      the processor compressing each of the distortion values as a fixed number of bits based upon a minimum distortion value amongst the stored distortion values, and re-storing each compressed distortion value in the storage device,
   wherein the processor is configured to compress each of the distortion values by determining, and storing in the storage device, binary integers p and q, both having user-defined bit lengths, the binary integer p including a series of bits, and the binary integer q determining, along with a fixed compression shift value s, the degree to which the binary integer p is shifted; and
   wherein the compressed distortion value exceeds the minimum distortion value by the value of p shifted based on q and s.

9. The system of claim 8, wherein the processor is configured to determine the distortion value as one of: a sum of absolute differences (SAD), a sum of absolute transformed differences (SATD), or a sum of square errors (SSE).

10. The system of claim 8, wherein the processor is configured to compress each of the distortion values using only add, shift, and bitwise AND operations.

11. The system of claim 8, wherein the processor is configured to compress each of the distortion values using a user-defined bit length of six for p and two for q.

12. The system of claim 8, wherein the processor is configured to decode each compressed distortion value for later computations, decoding comprising computing the value $p*2^{q+s}+D_k$, wherein $D_k$ comprises the minimum distortion value.

13. The system of claim 8, further configured to refine the trial motion vector associated with minimum distortion, wherein the processor is configured to:
   retrieve from the storage device a minimizing search region having the trial motion vector associated with the minimum distortion value;
   determine and store in the storage device a distortion value for each subregion in a predefined subset of predefined subregions of the minimizing search region, the predefined subset approximately centered around the trial motion vector associated with the minimum distortion value; and
   determine a new motion vector associated with minimum distortion from the distortion value for each subregion in the subset.

14. The system of claim 13, wherein the processor is further configured to interpolate a distortion value for each subregion not in the predefined subset of predefined subregions, using stored distortion values for subregions in the subset.

15. A non-transitory computer-readable storage medium including instructions which, when executed in a processing system, cause the system to compress motion estimation information by:
   determining and storing a distortion value for each trial motion vector in a plurality of trial motion vectors, wherein each trial motion vector specifies a position of a search region relative to a reference frame; and
   compressing each of the distortion values as a fixed number of bits based upon a minimum distortion value amongst the stored distortion values, and re-storing each compressed distortion value in place of its uncompressed value,
   wherein compressing each of the distortion values comprises determining and storing binary integers p and q, both having user-defined bit lengths, the binary integer p including a series of bits, and the binary integer q determining, along with a fixed compression shift value s, the degree to which the binary integer p is shifted; and
   wherein the compressed distortion value exceeds the minimum distortion value by the value of p shifted based on q and s.

16. The non-transitory computer-readable storage medium of claim 15, wherein compressing each of the distortion values requires only add, shift, and bitwise AND operations.

17. The non-transitory computer-readable storage medium of claim 15, wherein the compression further comprises refining the trial motion vector associated with minimum distortion by:
   retrieving a minimizing search region having the trial motion vector associated with the minimum distortion value;
   subdividing the minimizing search region into subregions;
   defining a subset of the subregions approximately centered around the trial motion vector associated with the minimum distortion value;
   determining and storing a distortion value for each subregion in the subset; and determining a new motion vector associated with a minimum distortion value from the distortion value for each subregion in the subset.

* * * * *